(12) United States Patent
Kaneko

(10) Patent No.: US 12,250,347 B2
(45) Date of Patent: Mar. 11, 2025

(54) PRINTER

(71) Applicant: BROTHER KOGYO KABUSHIKI KAISHA, Nagoya (JP)

(72) Inventor: Tomoya Kaneko, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/816,453

(22) Filed: Aug. 1, 2022

(65) Prior Publication Data

US 2023/0044845 A1 Feb. 9, 2023

(30) Foreign Application Priority Data

Aug. 5, 2021 (JP) ................................ 2021-128704

(51) Int. Cl.
| | | |
|---|---|---|
| H04N 1/00 | (2006.01) | |
| G05B 19/042 | (2006.01) | |
| G06F 15/16 | (2006.01) | |
| H04L 67/025 | (2022.01) | |
| H04N 1/04 | (2006.01) | |

(52) U.S. Cl.
CPC ....... H04N 1/00206 (2013.01); H04L 67/025 (2013.01); H04N 1/00244 (2013.01)

(58) Field of Classification Search
CPC ............ H04N 1/00206; H04N 1/00244; H04L 67/025; H04L 67/34
See application file for complete search history.

(56) References Cited

U.S. PATENT DOCUMENTS

| | | | | |
|---|---|---|---|---|
| 6,356,949 B1* | 3/2002 | Katsandres | ............. | G06F 9/547 709/217 |
| 7,165,109 B2* | 1/2007 | Chiloyan | ................ | H04L 67/51 709/227 |
| 7,307,745 B2* | 12/2007 | Tanaka | .................. | G06F 3/1289 358/1.15 |
| 8,810,837 B2* | 8/2014 | Ikeda | ................. | H04N 1/00244 358/1.15 |
| 9,369,595 B2* | 6/2016 | Kawabata | .......... | H04N 1/00464 |
| 9,639,784 B2* | 5/2017 | Kishimoto | ......... | H04N 1/00225 |

(Continued)

FOREIGN PATENT DOCUMENTS

JP 2018032891 A 3/2018

*Primary Examiner* — Thu V Nguyen
*Assistant Examiner* — Golam Mahmud
(74) *Attorney, Agent, or Firm* — Scully, Scott, Murphy & Presser, P.C.

(57) ABSTRACT

A printer includes a communication interface and a controller. The controller is configured to: in response to determining that an access condition is satisfied, acquire access information, access a server via the communication interface based on the acquired access information, and receive instruction data transmitted from the server, the instruction data being data indicating a process, the instruction data being configured to indicate data used in the printer; and in response to determining that the received instruction data is instruction data indicating a download setup process and that the received instruction data indicates setup data used for the download setup process, execute the download setup process, the download setup process being a process of downloading, via the communication interface, the setup data indicated in the instruction data and setting up the printer by using the downloaded setup data.

18 Claims, 14 Drawing Sheets

221

| ID | NAME | FUNCTION URL | EXECUTION CONDITION | |
|---|---|---|---|---|
| | | | REGULAR | TIMING |
| 1 | SETTING (HUMAN RESOURCES DEPARTMENT) | http://serverIP/download_setting/Human_Resources.xml | ○ | MONDAY |
| 2 | SETTING (SOFTWARE DEVELOPMENT DEPARTMENT) | http://serverIP/download_setting/Software_Development.xml | ○ | TUESDAY |
| 3 | SETTING (GENERAL AFFAIRS DEPARTMENT) | http://serverIP/download_setting/General_Affairs.xml | ○ | WEDNESDAY |
| 4 | DOWNLOAD PRINTING | http://serverIP/download_print.xml | — | — |
| 5 | CERTIFICATE SETTING | http://serverIP/download_setting/certificate.xml | ○ | 10TH DAY OF EVERY MONTH |
| 6 | PRINT SETTING (ECO-MODE) | http://serverIP/download_setting/printer_ecomode.xml | — | — |

(56) References Cited

U.S. PATENT DOCUMENTS

| | | | |
|---|---|---|---|
| 2003/0187958 A1* | 10/2003 | Aoki | H04N 1/00244 709/219 |
| 2007/0064683 A1* | 3/2007 | Furukawa | H04N 1/00244 370/352 |
| 2007/0223034 A1* | 9/2007 | Matsumoto | G06F 3/1206 358/1.15 |
| 2008/0120610 A1* | 5/2008 | Katano | G06F 8/65 717/168 |
| 2009/0249043 A1* | 10/2009 | Sato | G06F 9/3836 712/226 |
| 2010/0027057 A1* | 2/2010 | Fujisawa | H04N 1/00344 358/1.15 |
| 2014/0313548 A1* | 10/2014 | Nishikawa | G06F 3/1238 358/1.15 |
| 2016/0094728 A1* | 3/2016 | Saito | H04N 1/00501 358/1.15 |
| 2016/0292772 A1* | 10/2016 | Nagasaki | G06Q 30/0633 |
| 2017/0366687 A1* | 12/2017 | Okuno | G06F 3/1286 |
| 2018/0054540 A1* | 2/2018 | Okuno | G05B 19/042 |
| 2018/0338058 A1* | 11/2018 | Okuno | H04N 1/00411 |
| 2019/0303122 A1* | 10/2019 | Ban | G06F 9/44505 |
| 2020/0195791 A1* | 6/2020 | Takahashi | H04N 1/00973 |
| 2022/0405030 A1* | 12/2022 | Kaneko | G06F 3/1227 |

* cited by examiner

FIG. 1
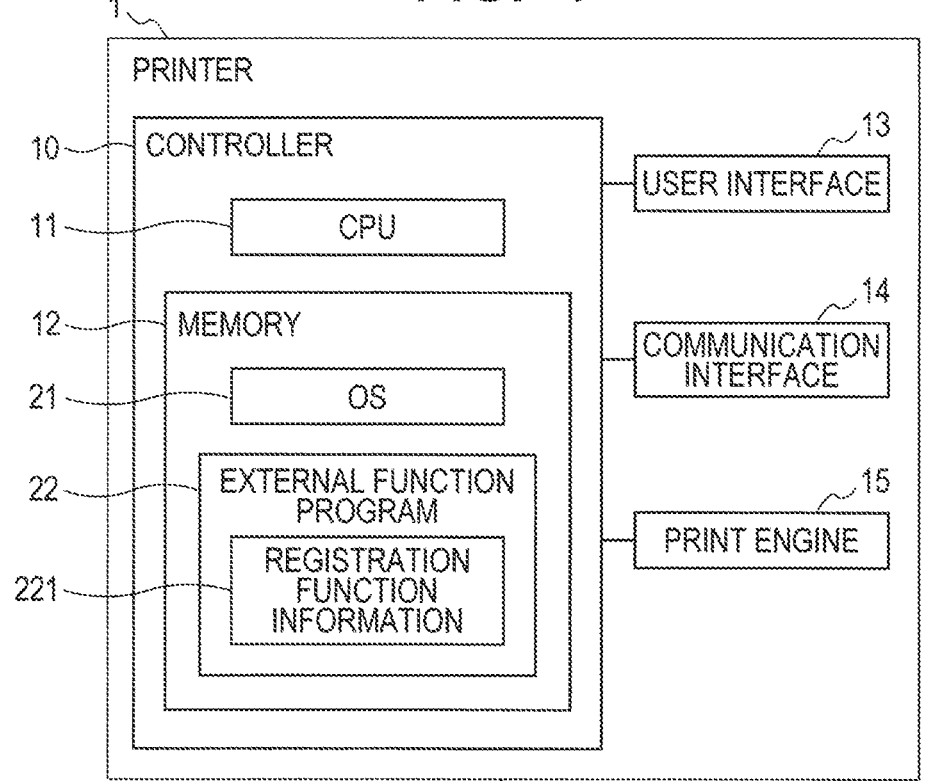
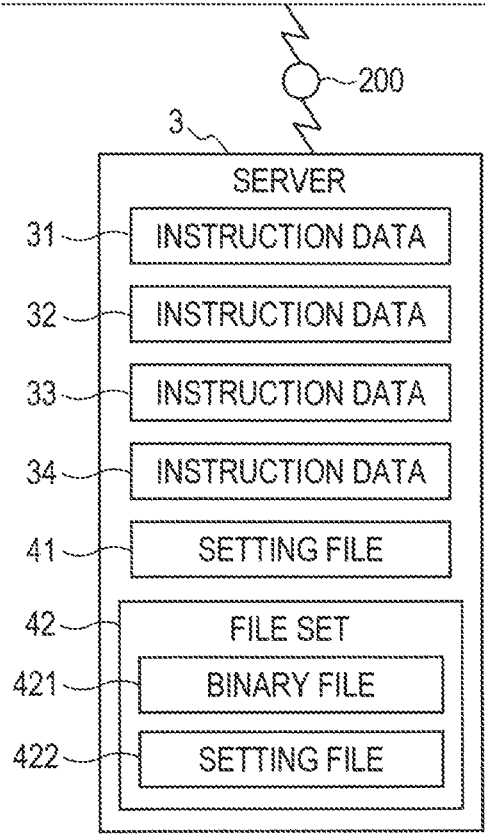

FIG. 2

| EXTERNAL FUNCTION REGISTRATION | |
|---|---|
| APPLICATION ID | 4 |
| NAME | DOWNLOAD PRINTING |
| URL | http://serverIP/download_print.xml |
| EXECUTION CONDITION | NONE ▽ |

( REGISTRATION )   ( CANCEL )

| ID | NAME | FUNCTION URL | EXECUTION CONDITION | |
|---|---|---|---|---|
| | | | REGULAR | TIMING |
| 1 | SETTING (HUMAN RESOURCES DEPARTMENT) | http://serverIP/download_setting/Human_Resources.xml | ○ | MONDAY |
| 2 | SETTING (SOFTWARE DEVELOPMENT DEPARTMENT) | http://serverIP/download_setting/Software_Development.xml | ○ | TUESDAY |
| 3 | SETTING (GENERAL AFFAIRS DEPARTMENT) | http://serverIP/download_setting/General_Affairs.xml | ○ | WEDNESDAY |
| 4 | DOWNLOAD PRINTING | http://serverIP/download_print.xml | — | — |
| 5 | CERTIFICATE SETTING | http://serverIP/download_setting/certificate.xml | ○ | 10TH DAY OF EVERY MONTH |
| 6 | PRINT SETTING (ECO-MODE) | http://serverIP/download_setting/printer_ecomode.xml | — | — |

```
<Display>
        <NextURL>http://www.server-c.com/sel_kind_result</NextURL>
        <Title>Select print type</Title>
        <Select key=kind>
                <Item val="1">Manual</Item>
                <Item val="2">Application form</Item>
        </Select>
</Display>
```
31

FIG. 7

```
<Command>
    <DownloadSetting>
        <Path>http://serverIP/download_setting/HR.pac</Path>
        <User>admin</User>
        <Password>PassA</Password>
    </DownloadSetting>
</Command>
```
~32

FIG. 8

```
<Command>
    <DownloadSetting>
        <Path>http://serverIP/download_setting/SSL.epac</Path>
        <User>admin</User>
        <Password>PassA</Password>
    </DownloadSetting>
</Command>
```
~33

FIG. 10

```
"settings" : {
  "general" : null ,
  "addressbook" : null ,
  "display" : null ,
  "printer" : null ,
  "scan" : null ,
  "copy" : {
    "copy" : {
      "quality" : "auto",
      "density" : "0",
      "contrast" : "2",
      "stack_sort" : "stack",
      "id_copy" : null ,
      "billings_copy" : null ,
      "color_adjust" : null
    }
  }
  "fax" : null ,
  "administrator" : null ,
  "network" : {
    "certificate" : null ,
    "wifi_direct_network" : null ,
    "protocol" : {
      "snmp" : null ,
      "proxy" : {
        "proxy_enabled" : true,
        "proxy_server_address" : "proxy.test.co.jp"
        "proxy_server_port" : 80,
        "user_name" : "admin",
        "password" : "password"
      },
    },
  },
}
```

```
"settings" : {
  "network" : {
    "certificate" : {
      "certificate" : [ null , null , null , null , null , null ] ,
      "ca_certificate" : [
        {
          "certificate_id" : 1 ,
          "content_file" : "ca_certificate1.bin"
        },
        null ,
        null ,
        null ,
        null ,
        null ,
        null ,
        null ,
        null ,
        null ,
      ],
    },
  },
}
```

FIG. 16

```
<Command>
        <DownloadPrint>
                    <Path>http://www.server-d.com/manual/users.prn</Path>
                    <Collate>1</Collate>
        </DownloadPrint>
</Command>
```

PRINTER

REFERENCE TO RELATED APPLICATIONS

This application claims priority from Japanese Patent Application No. 2021-128704 filed on Aug. 5, 2021. The entire content of the priority application is incorporated herein by reference.

BACKGROUND ART

A print system including a printer and a server is known.

DESCRIPTION

In a print system, a printer accesses a server, analyzes instruction data sent from the server, and performs processing according to the instruction data. The printer performs download printing of downloading a document from a storage and printing the document. For example, in a case where the instruction data includes an execution instruction for download printing, the printer performs download printing according to the instruction data.

A printer stores parameters related to image processing such as print settings and various certificates. Setup such as changing parameters related to image processing and installing various certificates is performed by accessing a server function built into the printer or by using a dedicated application program built into a device that can access the printer. However, it is tedious for an administrator to frequently perform such setup work for individual printers.

This specification discloses a technique for reducing the labor of setting up a printer in a printer that performs printing based on instruction data.

According to one aspect, this specification discloses a printer. The printer includes a communication interface and a controller. The controller is configured to: in response to determining that an access condition is satisfied, acquire access information, access a server via the communication interface based on the acquired access information, and receive instruction data transmitted from the server, the instruction data being data indicating a process, the instruction data being configured to indicate data used in the printer; and in response to determining that the received instruction data is instruction data indicating a download setup process and that the received instruction data indicates setup data used for the download setup process, execute the download setup process, the download setup process being a process of downloading, via the communication interface, the setup data indicated in the instruction data and setting up the printer by using the downloaded setup data.

According to the technique disclosed in the present specification, the access information and the access condition for receiving instruction data are registered in the printer. When the access condition is satisfied, the printer automatically receives the instruction data based on the access information, and the printer is automatically set up using the setup data downloaded based on the instruction data. This reduces the need for the administrator to operate on individual printers each time the setup is performed, and reduces the labor of the administrator for the setup. When a plurality of printers is managed, the setup for the plurality of printers is automatically completed by registering the access information and the access condition for each printer and updating the setup data corresponding to the access information. Thus, as compared with the case where the administrator operates for each printer at each setup, the labor for the administrator for the setup is reduced.

An image processing system including the printer, a control method for realizing the function of the printer, a computer program, and a computer-readable storage medium for storing the computer program are also new and useful and are disclosed herein.

FIG. 1 is a block diagram showing an electrical configuration of a system including a printer.

FIG. 2 is an explanatory diagram showing an example of an external function registration screen.

FIG. 3 is an explanatory diagram showing an example of registration function information.

FIG. 7 is an explanatory diagram showing an example of instruction data for download setting.

FIG. 8 is an explanatory diagram showing an example of instruction data for download setting.

FIG. 10 is an explanatory diagram showing an example of a setting file.

FIG. 16 is an explanatory diagram showing an example of instruction data for download printing.

Figure 4:
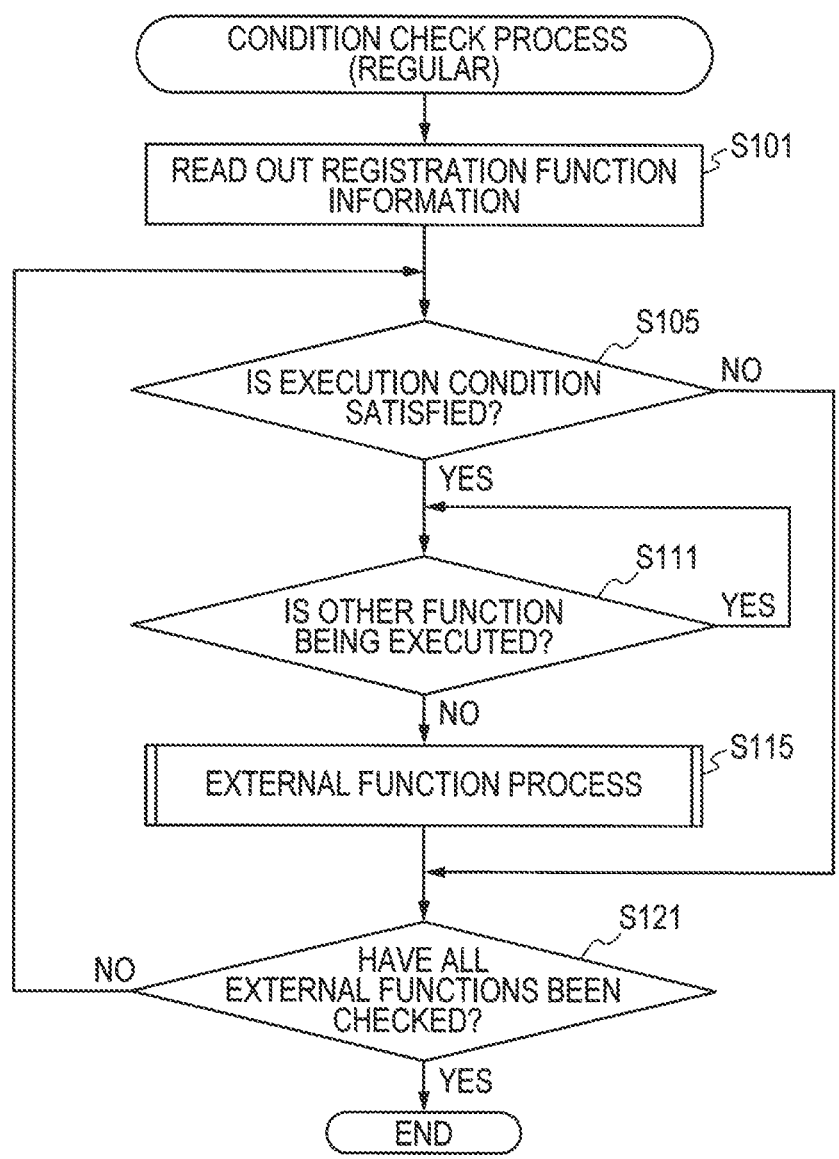
FIG. 4 is a flowchart showing a procedure of a condition confirmation process.

Hereinafter, a printer of an embodiment will be described in detail with reference to the attached drawings. As shown in FIG. 1, a printer 1 of the embodiment is connectable to a server 3 via a network 200.

As shown in FIG. 1, the printer 1 of this embodiment includes a controller 10 including a CPU 11 and a memory 12. Further, the printer 1 includes a user interface (hereinafter also referred to as "user IF") 13, a communication interface (hereinafter also referred to as "communication IF") 14, and a print engine 15, and these are electrically connected to the controller 10. The CPU 11 may be an example of a controller.

The CPU 11 executes various processes according to a program read from the memory 12 and based on a user's operation. As shown in FIG. 1, the memory 12 stores various programs and various information including an operating system (hereinafter referred to as "OS") 21 and an external function program 22. The memory 12 is also used as a work area when various processes are executed. A buffer included in the CPU 11 is also an example of the memory.

An example of the memory 12 is not limited to a ROM, a RAM, an HDD, and so on, built in the printer 1, and may be a storage medium that is read and written by the CPU 11. A computer-readable storage medium is a non-transitory medium. In addition to the above examples, the non-transitory medium also includes recording media such as a CD-ROM and a DVD-ROM. The non-transitory medium is also a tangible medium. On the other hand, an electric signal that carries a program downloaded from a server and so on, on the Internet is a computer-readable signal medium which is a kind of a computer-readable medium, but is not included in a non-transitory computer-readable storage medium.

The external function program 22 is a program for acquiring instruction data from an external device such as the server 3 and executes processing based on the acquired instruction data. The details of the external function program 22 will be described later.

The user interface 13 is a touch panel, for example. The user interface 13 includes hardware for displaying a screen for notifying the user of information and hardware for receiving operations by the user. The user interface 13 may be a set of a display and a button, a key, and so on.

The communication interface 14 includes a configuration that is connectable to the network 200. The communication interface 14 includes hardware for communicating with the server 3 via the network 200. The communication standard of the communication interface 14 may be Ethernet, Wi-Fi, USB, and so on ("Wi-Fi" is a registered trademark of the Wi-Fi Alliance). The printer 1 may include a plurality of communication interfaces 14 corresponding to a plurality of communication standards.

The print engine 15 includes a configuration for printing an image based on image data on a print medium such as a sheet. The image forming method of the print engine 15 is, for example, an electrophotographic method or an inkjet method.

As shown in FIG. 1, the server 3 stores one or more instruction data 31 and so on, and various files such as a setting file 41 and so on. The server 3 transmits the instruction data specified based on a transmission instruction from the printer 1 and so on. The server 3 is an example of a transmission source of instruction data. Each instruction data stored in the server 3 is information configured to be analyzed by the external function program 22 of the printer 1, and is, for example, an xml file prepared by the designer and so on of the system including the printer 1 and the server 3. The details of the instruction data and the setting file will be described later. The designer and so on of the system include, for example, a system administrator of a company that has introduced the printer 1, a vendor of the printer 1, and a designer or a service person of a manufacturer or a dealer of the printer 1.

Next, processes by the external function program 22 of the printer 1 will be described. The following process basically indicates the process of the CPU 11 according to the instruction described in a program. That is, the processes such as "determination", "extraction", "selection", "calculation", "decision", "identification", "acquisition", "reception", and "control" in the following description represent the processes by the CPU 11. The process by the CPU 11 also includes hardware control using an API of the OS. In this specification, the operation of each program will be described by omitting the description of the OS. That is, in the following description, the description that "a program B controls hardware C" may mean "a program B controls hardware C using the API of the OS". In addition, the process of the CPU 11 according to the instruction described in the program may be described in abbreviated wording. For example, it may be described as "the CPU 11 performs". Further, the process of the CPU 11 according to the instruction described in the program may be described by a wording that omits the CPU, such as "a program A performs".

Note that "acquisition" is used as a concept that does not require a request. That is, a process of receiving data without being requested by the CPU 11 is also included in the concept of "the CPU acquires data". The "data" in this specification is represented by a computer-readable bit string. Data having the same substantial meaning and different formats are treated as the same data. The same applies to "information" in this specification. Further, "request" and "instruct" are concepts indicating that information indicating that a request is being made or information indicating that an instruction is being given is outputted to the counterpart. Further, the information indicating that the request is being made or the information indicating that the instruction is being given is simply described as "request" or "instruction", respectively.

Further, the CPU 11's process of determining whether information A indicates matter B may be conceptually described as "determining from information A whether it is matter B". The CPU 11's process of determining whether information A indicates matter B or indicates matter C may be described conceptually as "determine from information A whether it is matter B or matter C".

The printer 1 of the present embodiment sequentially receives and processes a plurality of instruction data according to the external function program 22, for example, thereby executing an external function which is a function of executing a series of processes in which various processes are combined.

The printer 1 receives a registration instruction of an external function, for example, via the user interface 13. The printer 1 also receives a registration instruction of an external function via a personal computer and so on that is connectable to the printer 1. The personal computer and so on causes the printer 1 to register an external function by using, for example, an embedded web server provided in the printer 1 or an application program dedicated to registration of the external function.

In response to receiving a registration instruction of an external function, the printer 1 or the personal computer and so on displays, for example, a registration screen as shown in FIG. 2 and receives a user's input. The registration screen is a screen that receives input of the name of an external function, a function URL, and an execution condition. In response to receiving a registration instruction on the registration screen displayed on the user interface 13 of the printer 1, the printer 1 stores the received information in registration function information 221. When the personal computer and so on receives the registration instruction on the displayed registration screen, the personal computer and so on transmits the received information and a command for instructing registration to the printer 1. The printer 1 stores the received information in the registration function information 221. The process of storing the received information in the registration function information 221 is an example of a registration process. Note that "http" shown in FIG. 2 and so on may be changed to "https".

FIG. 3 shows an example of the registration function information 221. In the registration function information 221 shown in FIG. 3, a plurality of external functions have been registered, and a name, a function URL, and an execution condition are stored in association with one another for each external function. The function URL is information indicating a storage location of instruction data that the printer 1 acquires first at the time of execution of the external function. The function URL is an example of access information. The execution condition is a condition for automatically starting execution of the external function.

The execution condition is set for each function URL. The printer 1 receives designation of the execution condition specified by, for example, date and time, a period such as every particular time, or a condition such as power-on time. The execution condition is an example of an access condition.

The printer 1 of the present embodiment receives registration of a plurality of external functions, and a function URL and an execution condition are registered for each external function. The printer 1 also receives registration of an external function for which no execution condition is set. When no execution condition is set, the printer 1 does not automatically perform the external function. However, as described later, the printer 1 receives a manual execution instruction via the user interface 13. The example of the registration function information 221 shown in FIG. 3 includes an external function such as a "Setting (Human resources department)" function for which an execution condition is set and an external function such as a "Print setting (Eco-mode)" function for which no execution condition is set.

If the printer 1 performs a plurality of external functions in parallel, it may cause an error. When the printer 1 receives a registration instruction including designation of an execution condition, the printer 1 may determine whether the execution condition overlaps the execution conditions of already-registered external functions, and when determining that overlap occurs, the printer 1 may prompt a change of the execution condition.

The registration function information 221 may be stored in a non-volatile storage area in the memory 12 of the printer 1, or may be stored in another storage medium accessible by the printer 1. For example, the registration function information 221 may be stored in a USB memory connected to the printer 1, an HDD of a personal computer and so on connected to the printer 1, or a network storage connected to the printer 1. In any case, the printer 1 reads out the registration function information 221 from a storage location into the RAM such as when the printer 1 is started up and uses the registration function information 221.

A procedure of a condition check process will be described with reference to the flowchart of FIG. 4. When one or more external functions have been registered in the registration function information 221, the CPU 11 of the printer 1 performs the condition check process at a particular regular timing. A trigger of starting the execution of the condition check process is not limited to the regular timing and may be a particular timing such as when the power is turned on or when a job ends.

In the condition check process, the CPU 11 reads the registration function information 221 (S101), and checks registered external functions in order. When an execution condition is set for an external function to be checked, the CPU 11 determines whether the set execution condition is satisfied (S105). In response to determining that the execution condition is satisfied (S105: YES), the CPU 11 determines whether another function is being executed (that is, whether another function is currently executed) (S111). During execution of another external function or a job that is not executed in parallel with an external function, the printer 1 does not start new execution of an external function. In response to determining that another function is being executed (S111: YES), the CPU 11 waits for a particular time, and performs the determination of S111 again. In response to determining that no other function is being executed (S111: NO), the CPU 11 executes an external function process (S115).

The procedure of the external function process will be described with reference to the flowchart of FIG. 5. The CPU 11 reads out a function URL of an external function to be executed based on the registration function information 221 (S201). The CPU 11 accesses the server 3 by using the read function URL, and receives instruction data (S202). S202 is an example of a reception process.

Figures 6A, 6B:
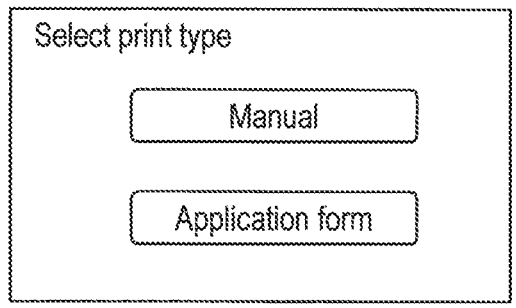
FIG. 6A is an explanatory diagram showing an example of instruction data for display instruction.
FIG. 6B is an explanatory diagram showing an example of a display screen.

The CPU 11 analyzes the instruction data received from the server 3, and performs the process instructed by the instruction data. As shown in FIGS. 6A, 7, and 8, the instruction data is, for example, an xml file including various tags. The names and values of various tags are not limited to examples in drawings, as long as the names and values are analyzable by the external function program 22 that analyzes instruction data.

The instruction data 31 shown in FIG. 6A is instruction data including a <Display> tag, and is display instruction data instructing the user interface 13 to perform screen display. Instruction data 32 shown in FIG. 7 and instruction data 33 shown in FIG. 8 are instruction data including a <Command> tag, and is operation instruction data instructing execution of a process specified by a subsequent tag. The CPU 11 analyzes the received instruction data, and determines whether the instruction data is the display instruction data or the operation instruction data (S203). Specifically, the CPU 11 determines the instruction data including the <Display> tag as the display instruction data, and determines the instruction data including the <Command> tag as the operation instruction data.

The instruction by the display instruction data is instruction to receive an input by the user, and is instruction to wait until an input by the user is received. In response to determining that the execution condition of the external function is satisfied in S105 of the condition check process, the printer 1 of the present embodiment automatically starts the execution of the external function in S115 of the condition check process. In a case where the execution condition is specified by a date and time or a period, the execution condition may be satisfied when the user does not exist nearby, and it is desirable that the execution of the external function is continued even in that case. Thus, the external function of automatically starting execution is often designed to include no display instruction data. For example, a download setting function described later is an external function that may be automatically executed by the printer 1 of the present embodiment, and is a function including no display instruction data. The display instruction data will be described later.

In response to determining that the received instruction data is the operation instruction data (S203: operation instruction), the CPU 11 determines whether the acquired instruction data is instruction data indicating instruction of download setting (S211). The operation instruction data includes information indicating a type of instructed process by a type tag subsequent to the <Command> tag.

The instruction data 32 shown in FIG. 7 and the instruction data 33 shown in FIG. 8 are instruction data including a <DownloadSetting> tag as a type tag subsequent to the <Command> tag, and are examples of instruction data indicating instruction of download setting. When the received instruction data is the instruction data 32 shown in FIG. 7 or the instruction data 33 shown in FIG. 8, the CPU 11 determines in S211 that the instruction data is instruction data of download setting.

The instruction data 32 shown in FIG. 7 is an example of instruction data acquired from the server 3 based on a function URL of an external function registered with a name of "Setting (Human resources department) as a record of ID=1. For example, when the execution condition of the external function of "Setting (Human resources department)" is satisfied, in S201, the CPU 11 reads the function URL included in the record of ID=1 from the registration function information 221, and receives the instruction data 32 in S202. The instruction data 33 shown in FIG. 8 is an example of the instruction data acquired from the server 3 based on the function URL of the external function registered with a name of "Certification setting" as a record of ID=5.

Figure 9:
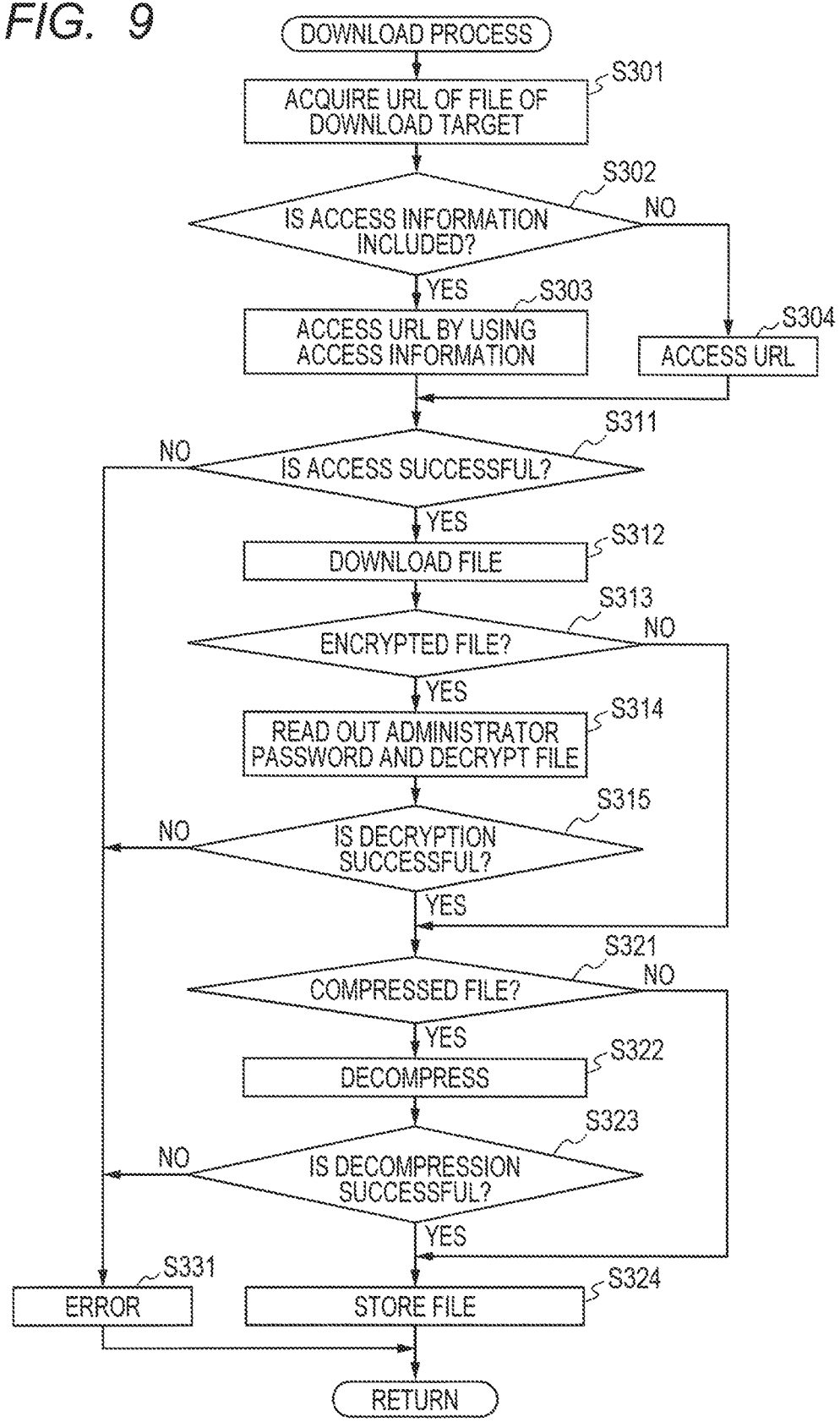
FIG. 9 is a flowchart showing a procedure of a download process.

In response to determining that the instruction data is instruction data of download setting (S211: YES), the CPU 11 performs a download process (S212). The download process is a process of downloading a setting file for download setting based on the instruction data received in S202. The procedure of the download process will be described with reference to the flowchart of FIG. 9.

In the download process, the CPU 11 acquires a URL specifying the file of the download target from the instruction data of the execution target (S301). The URL indicating a file of the download target is indicated by a <Path> tag, for example, in the instruction data 32 and the instruction data 33.

The CPU 11 further determines whether the instruction data of the execution target includes information for access (access information) that is necessary for acquiring the file of the download target (S302). In the instruction data 32 and the instruction data 33, access information is set by the <User> tag and the <Password> tag. In response to determining that the access information is included (S302: YES), the CPU 11 acquires the access information from the instruction data of the execution target, and accesses the server 3 by using the acquired information (S303). When the instruction data of the execution target is the instruction data 32 or the instruction data 33, the CPU 11 accesses the server 3 by using the user name and the password included in the instruction data in S303.

In response to determining that the instruction data of the execution target does not include access information (S302: NO), the CPU 11 accesses the server 3 without using access information (S304). In the present embodiment, a file of the download target is stored in the same server 3 as that of the instruction data. However, a file of the download target may be stored in a storage other than the server 3, as long as the file is stored in a storage destination accessible by the printer 1. In that case, too, the URL of the file of the download target is indicated by a <Path> tag.

After S303 or S304, the CPU 11 determines whether access to the specified URL has been successful (S311). In response to determining that appropriate access has been made (S311: YES), the CPU 11 acquires the file of the download target (S312). When the instruction data of the execution target is the instruction data 32 shown in FIG. 7, the CPU 11 downloads a file "HR.pac". When the instruction data of the execution target is the instruction data 33 shown in FIG. 8, the CPU 11 downloads a file "SSL.epac".

The CPU 11 determines whether the file is encrypted based on an extension of the specified file (S313). In the present embodiment, the extension "pac" of "HR.pac" indicates a compressed file that has not been encrypted. The extension "epac" of "SSL.epac" indicates a file that has been encrypted and compressed. The extension indicating encryption or compression is not limited to the example, and may be an extension that is determined by the external function program 22 that analyzes the instruction data.

In response to determining that the file is encrypted (S313: YES), the CPU 11 uses an administrator password stored in the memory 12 to attempt decryption of the file (S314). The CPU 11 determines whether the decryption has been successful (S315). In the printer 1 of the present embodiment, a file is encrypted such that a decryption key is an administrator password. However, the decryption key is not limited to the administrator password.

In response to determining that the file is not encrypted (S313: NO) or in response to determining that decryption has been successful (S315: YES), the CPU 11 determines whether the file is compressed based on the extension of the specified file (S321). In response to determining that the file is a compressed file (S321: YES), the CPU 11 attempts decompression (S322). The CPU 11 determines whether the decompression has been successful (S323). In response to determining that the file has been decompressed (S323: YES) or in response to determining that the file is not a compressed file (S321: NO), the CPU 11 stores the decompressed file or the file that is not compressed in the memory 12 (S324), and the download process ends.

The "HR.pac" is, for example, a file obtained by compressing the setting file 41 shown in FIG. 10 without encryption. The setting file 41 is a json file in which various setting values to be set by the printer 1 are described. When acquisition of "HR.pac" has been successful based on the instruction data 32, the CPU 11 determines as NO in S313 and YES in S321 and decompresses the file without decryption. When the decompression is successful, the CPU 11 acquires the setting file 41 shown in FIG. 10. In S324, the CPU 11 stores the acquired setting file 41 in the memory 12. The setting file 41 is an example of setup data. Details of the setting file 41 will be described later.

In response to determining that access to the specified URL has not been successful (S311: NO), in response to determining that decryption has failed (S315: NO), or in response to determining that decompression has failed (S323: NO), the CPU 11 determines that an error occurs (S331), and the download process ends. For example, when access information is incorrect or instruction data does not include necessary information, the CPU 11 cannot appropriately acquire a file of the download target. When a decryption key is different from the administrator password stored in the memory 12, the CPU 11 does not succeed in decryption. When there is no decompression program or a decompression program is broken, the CPU 11 fails in decompression.

Figure 5:
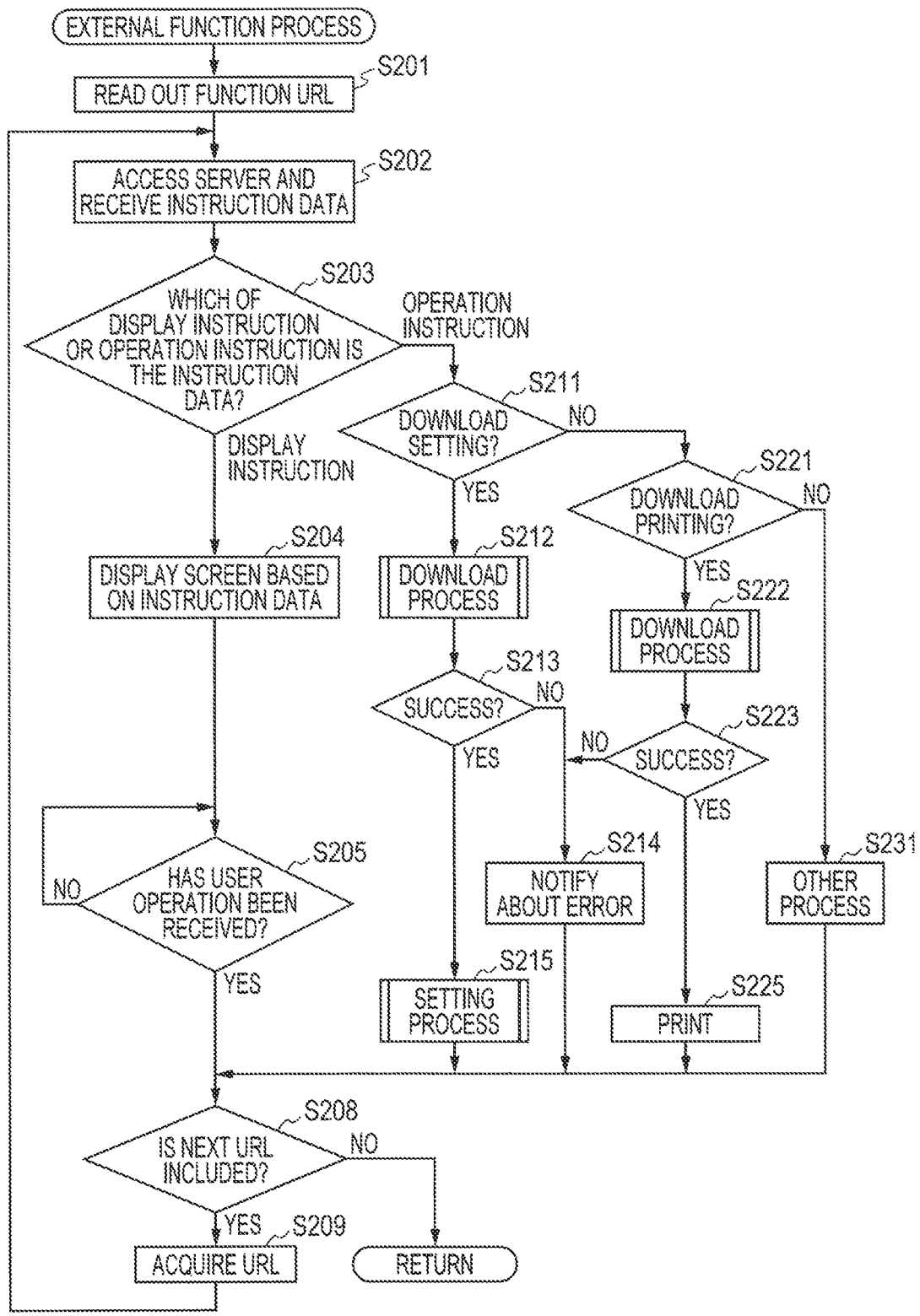
FIG. 5 is a flowchart showing a procedure of an external function process.

Description returns to the external function process of FIG. 5. After the download process in S212, the CPU 11 determines whether download has been successful (S213). In response to determining that the download has failed, that is, when it is determined that an error occurs in S331 of the download process (S213: NO), the CPU 11 issues a notification of the error (S214) and the external function process ends. When an error occurs in an external function that has been automatically started based on an execution condition, the CPU 11 may store the error in the memory 12 and display the error when a home screen is displayed, for example.

Figure 11:
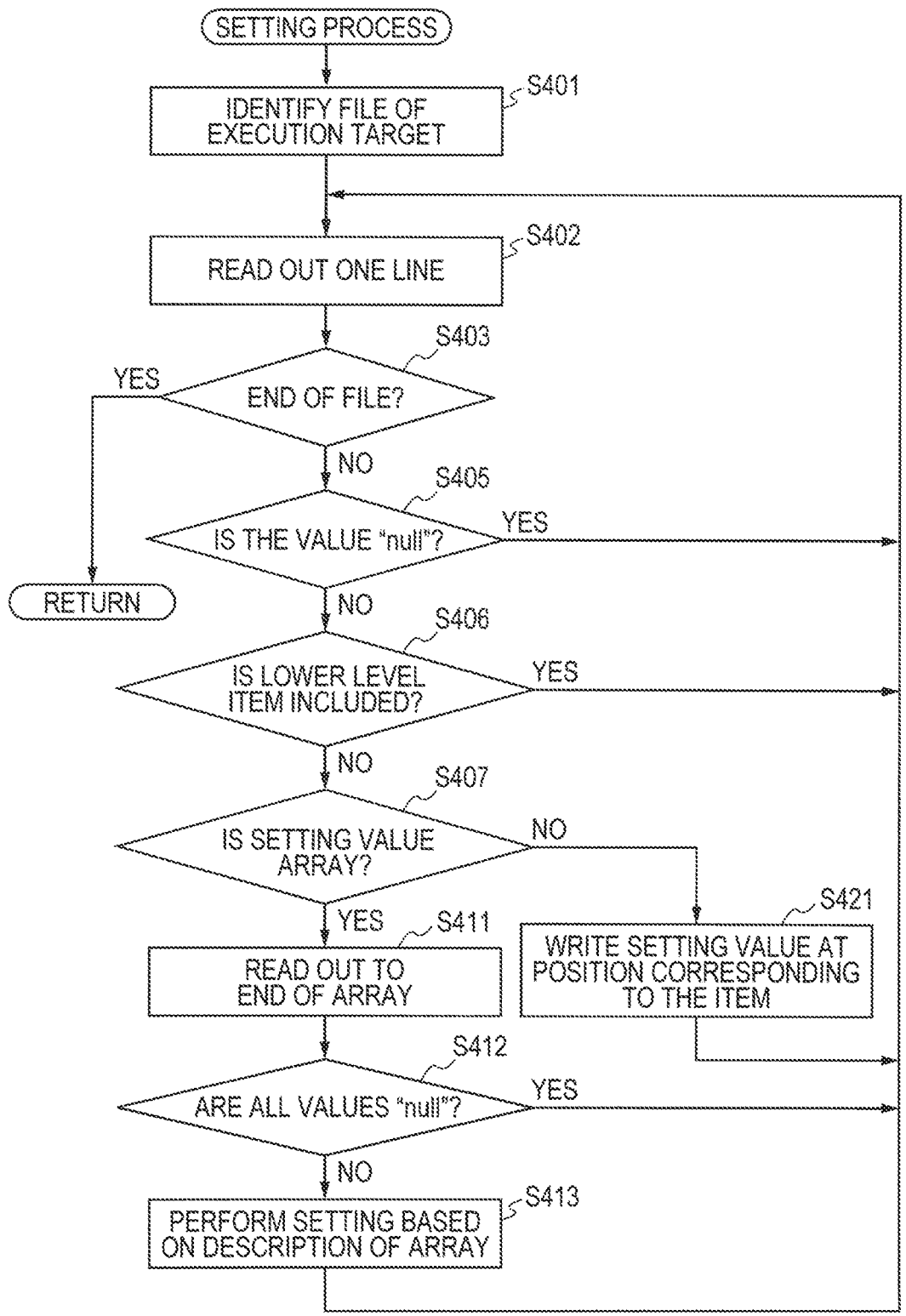
FIG. 11 is a flowchart showing a procedure of a setting process.

In response to determining that download has been successful (S213: YES), the CPU 11 performs a setting process (S215). The setting process is a process of setting up the printer 1 based on a setting file acquired by downloading. A set of the download process of S212 and the setting process of S215 is an example of a download setup process. A procedure of the setting process will be described with reference to the flowchart of FIG. 11.

In the setting process, the CPU 11 identifies a setting file of the execution target (S401). The setting file of the execution target in this case is a file stored in the memory 12 in S324 of the download process, and is, for example, the setting file 41 shown in FIG. 10. The CPU 11 reads one line from the identified file (S402), and determines whether the read line is an end of the file (S403).

In response to determining that the line is not the end of the file (S403: NO), the CPU 11 determines whether a specified value is "null" (S405). An item for which "null" is written in the setting file is an item whose setting does not need to be changed. For an item with a value of "null", the CPU 11 does not change the setting. In response to determining that the value is not "null" (S405: NO), the CPU 11 determines whether a lower level item is specified (S406). When the read one line includes a curly bracket "{" instead of a value, the CPU 11 determines that a lower level item is specified.

In response to determining that a lower level item is not specified (S406: NO), the CPU 11 determines whether values are described in an array (S407). When the read one line includes a square bracket "[", the CPU 11 determines that an array is described. In response to determining that an array is described (S407: YES), the CPU 11 reads up to the end of the array indicated by a square bracket "]" (S411), and determines whether all values included in the read array are "null" (S412). In response to determining that a value other than "null" is included (S412: NO), the CPU 11 stores the value described in the array in a particular storage location in a non-volatile storage area of the memory 12 as a parameter (S413). An example of the setting file including an array will be described later.

In response to determining that an array is not described (S407: NO), the CPU 11 writes a value described in the setting file at a storage location corresponding to the item in the memory 12 as a parameter (S421). The parameter stored in S413 or S421 may be a parameter regularly used as default or may be a parameter temporarily stored similarly to the previously used parameter. The storage location in which a parameter is stored in S413 or S421 may be a non-volatile storage area or may be a volatile storage area.

After S413 or S421, in response to determining that the value is "null" (S405: YES), in response to determining that a lower level item is included (S406: YES), or in response to determining that all values included in an array are "null" (S412: YES), the process returns to S402 and the CPU 11 reads next one line. When the CPU 11 determines that the read line is the end of the file (S403: YES), the setting process ends and the process returns to the external function process.

The items described in a setting file as a value of a setting target include an item in which a parameter itself is described and an item in which a binary file name is described. When the setting file of the setting target includes an item in which a parameter itself is described, in S421 of the setting process, the CPU 11 stores the described value in a particular area in the memory 12 of the printer 1. When the setting file of the setting target includes an item in which a binary file name is described, in S421 of the setting process, the CPU 11 stores the specified binary file in a particular area in the memory 12.

For example, the setting file 41 shown in FIG. 10 is an example in which a parameter itself is described, and includes a value other than "null" in items such as "copy" and "proxy". When the setting process is executed with the setting file 41 as a target, the CPU 11 stores a print parameter used in a copy process and a proxy parameter used for network connection in the memory 12 of the printer 1. Specifically, for example, the CPU 11 sets a value of the item "quality" of copy setting as "auto", a value of the item "density" as "0", and a value of the item "contrast" as "2". When a copy execution instruction is received after the setting process is executed, the printer 1 uses the parameters set as described above as default parameters. When a network connection instruction is received after the setting process is executed, the printer 1 performs communication using a proxy set based on the setting file 41.

Even when parameters are already set, the CPU 11 overwrites parameters based on the setting file 41 by executing the setting process. Thus, for example, even when the user temporarily changes various parameters and uses the printer 1, the parameters return to the parameters specified in the setting file 41 by execution of the setting process.

Figures 12, 13:
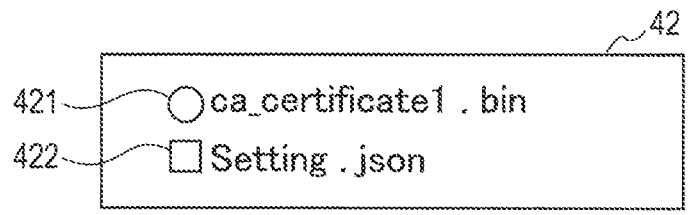
FIG. 12 is an explanatory diagram showing an example of a file set configuration.
FIG. 13 is an explanatory diagram showing an example of a setting file.

FIGS. 12 and 13 show examples of a setting file including an item in which a binary file name is described. FIG. 12 shows an example of a file set 42 acquired by the CPU 11 when the above-described download process is executed. The "SSL.epac" specified in the instruction data 33 is, for example, a file obtained by encrypting the file set 42 shown in FIG. 12 and further compressing the file. The file set 42 includes a binary file 421 and a setting file 422.

When "SSL.epac" is downloaded based on the instruction data 33, the CPU 11 determines as YES in S313 and S321 of the download process, and attempts decryption and decompression. When decryption and decompression are successful, the CPU 11 acquires the file set 42 shown in FIG. 12. In S324 of the download process, the CPU 11 stores these two files in the memory 12. The binary file 421 is an example of setup data.

As shown in FIG. 13, the setting file 422 includes, for example, an item in which a binary file name indicating the binary file name 421 and an item in which as an array is specified. When the setting process is executed with the setting file 422 as a setting target, the CPU 11 stores the binary file 421 in a particular storage location of the memory 12. As shown in the fourth line of FIG. 13, the range surrounded by "[" and "]" is description of the array. The setting file 422 shown in FIG. 13 does not include description of a parameter itself but may include description of a parameter itself.

The binary file 421 described in the setting file 422 is, for example, data indicating an SSL server certificate. The setting file 422 is a json file indicating an instruction of storing the binary file 421 in the memory 12 as an SSL server certificate. When the setting process is executed with the setting file 422 as a setting target, the binary file 421 is stored in a particular storage location of the memory 12, and the printer 1 uses the stored binary file 421 as an SSL server certificate. When an SSL server certificate is already stored in the particular storage location of the memory 12, the CPU overwrites the existing data with the data indicated by the binary file 421. Thus, the SSL server certificate stored in the memory 12 is always updated.

The printer 1 has a function of performing, as a web server, HTTPS communication with a web browser. The HTTPS communication is encrypted HTTP communication. The SSL server certificate is incorporated in the printer 1 in order to certify an owner of a website by the printer 1 when the printer 1 performs the HTTPS communication. The SSL server certificate is attached when image data read by a scanner is transmitted to a storage, for example. The communication between the printer 1 and the server 3 may be the HTTPS communication or may not be the HTTPS communication.

The setting files are not limited to those exemplified. A binary file may be included in a file that has been compressed without encryption, or even a file subjected to encryption and compression may not include a binary file. There may be a setting file that is not compressed. The binary file of the setting target is not limited to the SSL server certificate.

Description returns to the external function process of FIG. 5. After S214 or S215, the CPU 11 determines whether next instruction data exists (S208). In the present embodiment, the external function automatically started due to the execution condition being satisfied is the download setting instruction and no next instruction data is included. When the CPU 11 determines that no next instruction data exists (S208: NO), the external function process ends and the process returns to the condition check process. The instruction data that is automatically started may include next instruction data. For example, an external function that performs a plurality of download settings successively may be registered.

Description returns to the condition check process of FIG. 4. After the end of the external function process of S115, the CPU 11 determines whether the execution conditions have been checked for all external functions that are registered in the registration function information 221 (S121). In response to determining that there is an external function that has not been checked (S121: NO), the process returns to S105 and the CPU 11 determines whether the execution condition is satisfied. In response to determining that all external functions have been checked (S121: YES), the CPU 11 ends the condition check process. At the next regular timing, the CPU 11 performs the condition check process again.

A procedure of a manual start process will be described with reference to the flowchart of FIG. 14. The CPU 11 of the printer 1 performs the manual start process in response to reception of an execution instruction of the external function program 22 due to an operation of the user interface 13. The printer 1 receives the execution instruction of the external function program 22 during display of a home screen that is a standby screen for receiving various instructions. A step similar to that in the condition check process shown in FIG. 4 is denoted with the same numeral as that in the condition check process shown in FIG. 4 and description thereof will be omitted.

Figure 15:
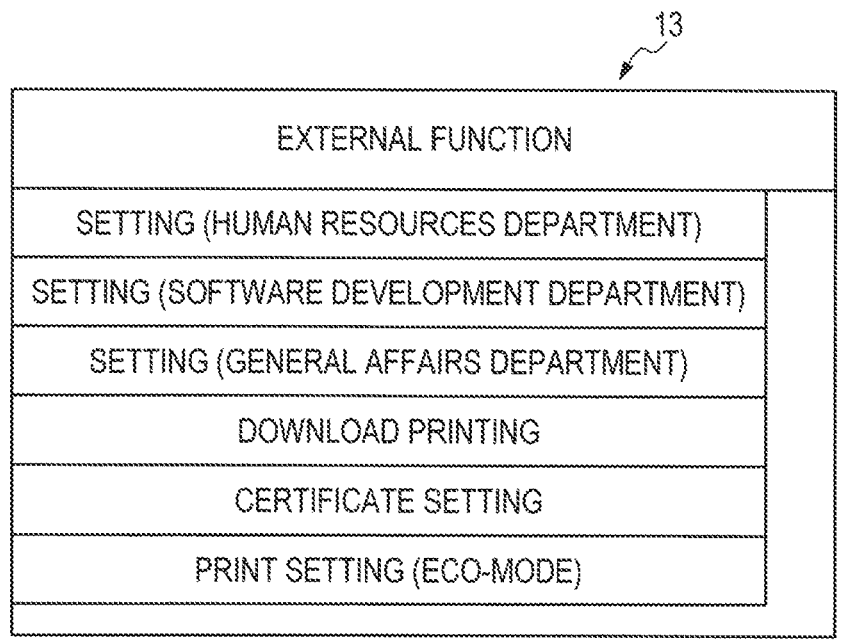
FIG. 15 is an explanatory diagram showing an example of a list of names.

In the manual start process, the CPU 11 reads out the registration function information 221 (S101), and a list of names of the registered external functions is displayed on the user interface 13 (S502). In a case where the registration function information 221 shown in FIG. 3 is registered, for example, as shown in FIG. 15, the list of names is displayed on the user interface 13. The registration function information 221 may include information indicating whether a manual execution instruction may be accepted. In that case, the CPU 11 does not display, in the list of names, a name of an external function associated with information indicating that a manual execution instruction may not be accepted.

The CPU 11 determines whether selection of an external function to be executed and an execution instruction thereof have been received from among the list of names (S503). S503 is an example of a reception process. In response to determining that the execution instruction has not been received (S503: NO), the CPU 11 determines whether an end instruction of the external function program 22 has been received (S504). In response to determining that the end instruction has not been received (S504: NO), the CPU 11 waits until a function execution instruction or an end instruction is received.

In response to determining that selection of an external function and an execution instruction thereof have been received (S503: YES), the CPU 11 determines whether another function is being executed (S111). In response to determining that another function is being executed (S111: YES), the CPU 11 issues a notification that another function is being executed (S512), waits for a particular time, and performs the determination of S111 again. In response to determining that no other function is being executed (S111: NO), the CPU 11 executes the external function process (S115).

When a manual execution start instruction has been received, the instruction data received in S202 of the external function process shown in FIG. 5 may be instruction data of a display instruction or may be instruction data of an operation instruction. In response to determining that the received instruction data is display instruction data (S203: display instruction), the CPU 11 displays a display screen on the user interface 13 based on the instruction data (S204). For example, when "Download Printing" has been selected in the list of names shown in FIG. 15, the CPU 11 receives the instruction data 31 shown in FIG. 6A and displays the selection screen for receiving selection of data of the print target as shown in FIG. 6B. The CPU 11 waits until receiving a selection operation of the user via the user interface 13 on the selection screen that is being displayed (S205).

In response to determining that a selection operation by the user has been received (S205: YES), the CPU 11 determines whether the instruction data being processed includes information for requesting transmission of next instruction data (S208). The instruction data may include instruction to acquire next instruction data. The next instruction data is instruction data that is received after the instruction data which is currently processed. The instruction data 31 shown in FIG. 6A includes a URL for requesting next instruction data as information of the <NextURL> tag. A designer and so on of a system including the printer 1 and the server 3 may perform a design of executing a series of processes based on instruction data by storing a plurality of instruction data in the server 3 and causing the printer 1 to access the server 3. In S208, the CPU 11 determines whether the instruction data being processed includes a <NextURL> tag.

In response to determining that the instruction data being processed includes information for requesting transmission of next instruction data (S208: YES), the CPU 11 acquires a next URL based on information of the <NextURL> tag (S209). The process returns to S202, and the CPU 11 receives next instruction data from the server 3 and determines whether the next instruction data received from the server 3 is a display instruction or an operation instruction.

For example, in response to receiving selection of data of the print target in the selection screen shown in FIG. 6B, the CPU 11 acquires a next URL based on the information of the <NextURL> tag included in the instruction data 31 and on the received selection result, and uses the acquired URL to request the server 3 to transmit next instruction data. The server 3 may have a function of creating next instruction data based on the information received from the printer 1.

In response to determining that the instruction data received based on the selection operation by the user is an operation instruction and is instruction data for download setting (S211: YES), the CPU 11 performs the download process and the setting process as described above. For example, when "Setting (Human resources department)" or "Certification setting" has been selected in the list of names shown in FIG. 15, the CPU 11 receives the instruction data 32 shown in FIG. 7 or the instruction data 33 shown in FIG. 8 described above, and performs the above-described processes similarly to the case where the external function process is started automatically.

In response to determining that the instruction data received in S202 is an operation instruction and is not instruction data for download setting (S211: NO), the CPU 11 determines whether the instruction data is instruction data for download printing (S221). The instruction data received as the next instruction data of the instruction data 31 shown in FIG. 6A is, for example, the instruction data 34 shown in FIG. 16, and is instruction data indicating an operation instruction of download printing. The instruction data for download printing is instruction data including a <DownloadPrint> tag as the type tag subsequently to the <Command> tag.

In response to determining that the instruction data is instruction data for download printing (S221: YES), the CPU 11 performs a download process (S222). The download process of S222 is a process similar to the download process of S212. That is, the CPU 11 downloads a file of the download target that is indicated by a <Path> tag. The file of the download target in this case is an example of print data.

After S222, the CPU 11 determines whether download has been successful (S223). S223 is a process similar to S213. In response to determining that download has not been successful (S223: NO), the CPU 11 issues a notification of an error (S214). In response to determining that download has been successful (S223: YES), the CPU 11 performs printing based on the downloaded file (S225). A set of the S222 and S225 is an example of a download printing process. When a print parameter is set by the above-described setting process, the CPU 11 performs printing by using the set print parameter. S225 is also an example of a printing process.

In response to determining that the instruction data received in S202 is an operation instruction, is not instruction data for download setting, and is not instruction data for download printing (S221: NO), the CPU 11 performs another process based on description of the instruction data (S231). For example, when the printer 1 includes a scanner, a process based on instruction data for scan upload may be executed.

After any of S214, S215, S225, S231, the process proceeds to S208 and the CPU 11 determines whether next instruction data exists. When the CPU 11 determines that no next instruction data exists (S208: NO), the external function process ends and the process returns to the manual start process.

Figure 14:
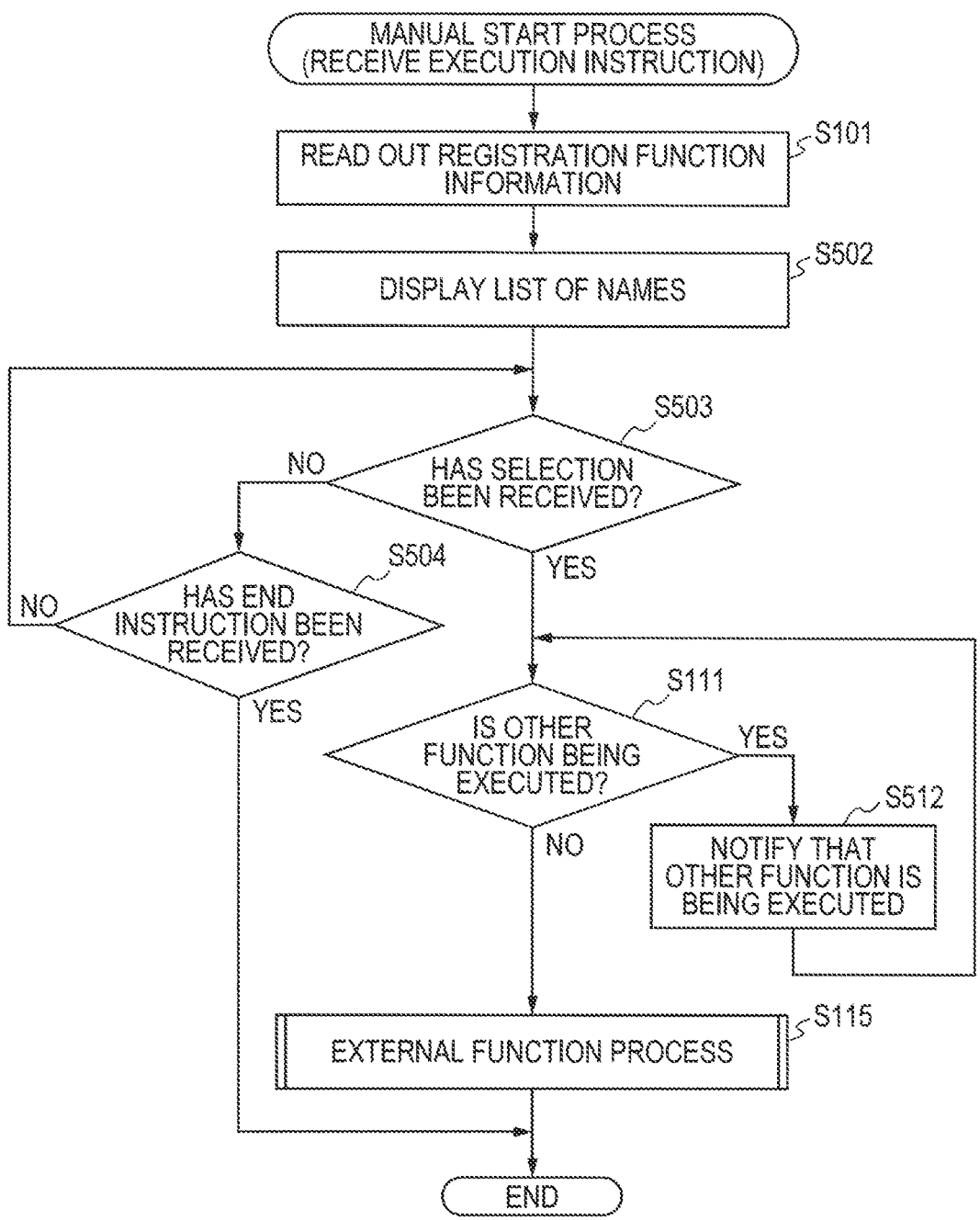
FIG. 14 is a flowchart showing a procedure of a manual start process.

Description returns to the manual start process of FIG. 14. In response to receiving an end instruction without selecting an external function after display of the list of names (S504: YES), or after the external function process of S115, the CPU 11 ends the manual start process. After the manual start process ends, the printer 1 returns to display of the standby screen, for example. After the end of the external function process in S115, the printer 1 may return to display of the list of names of external functions.

In the registration function information 221 shown in FIG. 3, in addition to the external function registered with the name "Setting (Human resources department)" and the external function registered with the name "Certification setting" described above, a plurality of external functions for performing download setting are registered. The external functions for performing download setting includes a function for which an execution condition is set and a function for which no execution condition is set. The external function for which an execution condition is set is automatically executed when the execution condition is satisfied, and is also executed when a manual execution instruction is received. The external function for which no execution condition is set is not automatically executed and is executed only when a manual execution instruction is received.

In the example of the registration function information 221 shown in FIG. 3, for example, the "Setting (Human resources department)" and "Certification setting" are external functions of download setting for which an execution condition is set, and "Printing setting (Eco-mode)" is an external function of download setting for which no execution condition is set. A function URL of an external function for which an execution condition is set is an example of first access information, and the server 3 indicated by a function URL is an example of a first server. Instruction data indicated by the function URL, for example, the instruction data 32 shown in FIG. 7 is an example of first instruction data. A setup data indicated by the first instruction data, for example, the setting file 41 indicated in FIG. 10 is an example of first setup data.

The function URL of the external function for which no execution condition is set is an example of second access information, and the server 3 indicated by the function URL is an example of a second server. The server indicated by the function URL of each external function is not limited to the same server 3, and may be servers different from each other. The instruction data shown by the function URL of "Print setting (Eco-mode)" is instruction data instructing download of a setting file and setting similarly to the instruction data 32, and is an example of second instruction data. The setting file indicated by the instruction data of "Print setting "Eco-mode)" is an example of second setup data.

As described above in detail, the printer 1 of this embodiment receives the registration of the registration function information 221. When the execution condition indicated by the registered registration function information 221 is satisfied, the printer 1 automatically receives instruction data from the server 3 based on the function URL indicated by the registration function information 221. If the received instruction data is instruction data instructing a download setting, the printer 1 downloads a setting file used for the download setting based on the instruction data, and sets up the printer 1 using the downloaded setting file. This reduces the need for the administrator to operate on individual printers each time the setup is performed, and reduces the labor of the administrator for the setup work. Further, when a plurality of printers are managed, the setup of the plurality of printers is automatically completed by registering the registration function information 221 in each printer and updating the data used for the download setting. Thus, as compared with the case where the administrator operates for each printer at each setup, the labor for the administrator for the setup work is reduced.

The printer 1 of this embodiment executes a plurality of processes. The printer 1 executes download settings corresponding to a plurality of executable processes, and stores parameters and so on in the memory 12 for each corresponding process in each download setting. Even if a print parameter used for the printing process is changed by the user, the printer 1 automatically restores the print parameter by the download setting. Further, when a plurality of printers is managed, the print parameters stored in those printers are communized.

The printer 1 sets up an SSL server certificate used for the HTTPS communication process by download setting. The administrator may register an external function for automatically downloading and setting the SSL server certificate in the registration function information 221 of the plurality of printers. After that, the administrator only stores the latest SSL server certificate in the server 3 and so on, and the SSL server certificate is automatically downloaded and set in each printer. Further, the printer 1 of this embodiment is configured to execute download printing in addition to the download setting, which increases the convenience of the printer 1.

In this embodiment, a plurality of external functions may be registered in the registration function information 221 and an execution condition may be set for each external function. Thus, for example, setup is performed at an appropriate timing for each setup target. In this embodiment, both an external function for automatically setting up by registering an execution condition and an external function for accepting manual setup without registering an execution condition may be registered, and both types of external functions are used properly depending on the purpose. For the external function that accepts manual setup, the user may perform setup at arbitrary timing. Since the setup target is selected at the time of manual setup, the user may perform setup of arbitrary information at arbitrary timing.

While the invention has been described in conjunction with various example structures outlined above and shown in the figures, various alternatives, modifications, variations, improvements, and/or substantial equivalents, whether known or that may be presently unforeseen, may become apparent to those having at least ordinary skill in the art. Thus, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

For example, the printer is not limited to a single-function printer, but may be applied to any apparatus having a printing function and a communication function via a network, such as a multifunction peripheral, a copier, and a fax machine.

In the above-described embodiment, the printer 1 is configured to set a print parameter and an SSL server certificate as the download setting, but only one of them may be possible. In the above-described embodiment, a manual download setting is possible, but the printer 1 may be configured to execute the download setting only automatically and not accept a manual execution instruction. Alternatively, the printer 1 may be set regarding whether to accept the manual execution instruction. By accepting the manual execution instruction, the printer 1 may be set at arbitrary timing desired by the user. In addition to the download setting, there may be an external function that is automatically executed based on an execution condition.

In the above-described embodiment, a json file is shown as an example of a setting file, but the present disclosure is not limited to this. For example, there may be a setting file of an xml file. In the above-described embodiment, the SSL server certificate is shown as an example of a binary file which is set by the setting file, but the present disclosure is not limited to this. For example, there may be a setting file that includes a token as a binary file of the setting target.

In the above-described embodiment, the display instruction is not included in the external function which is automatically started based on the execution condition, but the display instruction may be included. For example, there may be an external function that is started on condition that it is detected that a user stands in front of the printer 1.

In the above-described embodiment, as the download printing process, printing is performed after download of an entire file of the print target is completed, but the present disclosure is not limited to this. For example, the printer 1 may start printing based on the downloaded portion before download of the entire file of the print target is completed, and the download and the printing may be performed in parallel.

In any of the flowcharts disclosed in the embodiments, the plurality of processes in any of the plurality of steps may be arbitrarily changed in the execution order or executed in parallel as long as the process contents do not conflict with each other.

The processes disclosed in the embodiment may be executed by a single CPU, a plurality of CPUs, hardware such as an ASIC, or a combination thereof. Further, the processes disclosed in the embodiment may be realized in various modes such as a storage medium storing a program for executing the processes, a method, and so on.

What is claimed is:

1. A printer comprising:
a user interface;
a communication interface;
a memory storing an external function program; and
a controller configured to execute the external function program to:
 access a server via the communication interface, receive instruction data transmitted from the server, and analyze the received instruction data;
 in response to determining that the instruction data includes a tag indicating an operation instruction and a tag indicating download printing, execute a download printing process of downloading, via the communication interface, print data indicated in the instruction data and performing printing based on the downloaded print data;
 in response to determining that the instruction data includes a tag indicating the operation instruction and a tag indicating download setup, execute a download setup process of downloading, via the communication interface, setup data indicated in the instruction data and setting up the printer based on the downloaded setup data;
 in response to determining that the instruction data includes a tag indicating a display instruction, control the user interface to display a display screen based on the instruction data, the display screen being configured to include options in accordance with the instruction data;
 in response to receiving, via the user interface, an operation of selecting one of the options included in the display screen, access a server indicated by access information included in the instruction data and receive next instruction data from the server;
 in response to determining that the next instruction data includes a tag indicating the operation instruction and a tag indicating the download printing, execute the download printing process in accordance with the next instruction data; and in response to determining that an execution condition is satisfied, the execution condition being that execution timing set by one timing information among a plurality of timing information stored in the memory has come, access a server indicated by access information associated with the one timing information, and in response to determining that the instruction data received from the server includes a tag indicating the operation instruction and a tag indicating the download setup, execute the download setup process, each of the plurality of timing information being associated with a respective one of a plurality of access information, and different timings being configured to be set to the plurality of timing information.

2. The printer according to claim 1, wherein the printer is configured to execute a plurality of processes;

wherein the setting up the printer includes storing, in the memory, data used in one of the plurality of processes; and wherein the download setup process includes:
in a case where the downloaded setup data indicates data to be stored in the memory of the printer, setting up the printer by storing the data indicated in the downloaded setup data in the memory of the printer.

3. The printer according to claim 2, wherein the printer is configured to execute a printing process as one of the plurality of processes;

wherein the download setup process includes:
in a case where the downloaded setup data indicates a print parameter as the data to be stored in the memory of the printer, setting up the printer by storing, in the memory, the print parameter indicated in the downloaded setup data; and wherein the printer is configured to:
in the printing process after storing the print parameter in the memory in the download setup process, perform printing by using the print parameter stored in the memory of the printer in the download setup process.

4. The printer according to claim 2, wherein the printer is configured to perform an HTTPS communication process;

wherein the download setup process includes:
in a case where the downloaded setup data indicates an SSL server certificate as the data to be stored in the memory of the printer, setting up the printer by storing, in the memory, the SSL server certificate indicated in the downloaded setup data; and wherein the printer is configured to:
in the HTTPS communication process after storing the SSL server certificate in the memory in the download setup process, perform the HTTPS communication process by using the SSL server certificate stored in the memory of the printer in the download setup process.

5. The printer according to claim 1,
wherein the controller is configured to:
receive, via the user interface, an execution instruction of a process corresponding to the acquired access information;
in response to receiving the execution instruction, access, via the communication interface, the server that is a transmission source of the instruction data based on the acquired access information;

receive the instruction data transmitted from the server; and in response to determining that the received instruction data is instruction data indicating the download setup process and that the received instruction data indicates setup data to be used for the download setup process, execute the download setup process.

6. The printer according to claim 1,
wherein the controller is configured to:
in response to receiving, via the user interface, an operation indicating registration of the access information, execute a registration process of storing the access information associated with the operation.

7. The printer according to claim 1, wherein the controller is configured to:
in response to receiving, via the communication interface, a command indicating registration of the access information, execute a registration process of storing the access information associated with the command.

8. The printer according to claim 1, wherein the controller is configured to:
determine whether an other process is currently executed, the other process being not executable in parallel with a process indicated by the instruction data;
in response to determining that the other process is not currently executed, acquire the access information; and
in response to determining that the other process is currently executed, wait until execution of the other process ends and then acquire the access information.

9. The printer according to claim 1, wherein the execution condition is specified by a date and time that is preliminarily designated.

10. The printer according to claim 1, wherein the execution condition is specified by a particular day of every week or a particular day of every month that is preliminarily designated.

11. The printer according to claim 1, wherein the execution condition is specified by a condition that a power of the printer is turned on.

12. The printer according to claim 1, wherein the execution condition is specified by a condition that a job of the printer ends.

13. The printer according to claim 1, wherein the download setup process excludes the download printing process and a scan upload process, the scan upload process being a process of performing scan and uploading scan data via the communication interface.

14. A printer comprising:
a user interface;
a communication interface;
a memory storing an external function program; and
a controller configured to execute the external function program to:
access a server via the communication interface, receive instruction data transmitted from the server, and analyze the received instruction data;
in response to determining that the instruction data includes a tag indicating an operation instruction and a tag indicating download printing, execute a download printing process of downloading, via the communication interface, print data indicated in the instruction data and performing printing based on the downloaded print data;
in response to determining that the instruction data includes a tag indicating the operation instruction and a tag indicating download setup, execute a download setup process of downloading, via the communication interface, setup data indicated in the instruction data and setting up the printer based on the downloaded setup data;

in response to determining that the instruction data includes a tag indicating a display instruction, control the user interface to display a display screen based on the instruction data, the display screen being configured to include options in accordance with the instruction data;

in response to receiving, via the user interface, an operation of selecting one of the options included in the display screen, access a server indicated by access information included in the instruction data and receive next instruction data from the server;

in response to determining that the next instruction data includes a tag indicating the operation instruction and a tag indicating the download printing, execute the download printing process in accordance with the next instruction data; and in response to determining that an execution condition is satisfied, the execution condition being that execution timing set by one timing information among a plurality of timing information stored in the memory has come, access a server indicated by access information associated with the one timing information, and in response to determining that the instruction data received from the server includes a tag indicating the operation instruction and a tag indicating the download setup, execute the download setup process, each of the plurality of timing information being associated with a respective one of a plurality of access information, and different timings being configured to be set to the plurality of timing information, the download setup process excluding the download printing process and a scan upload process, the scan upload process being a process of performing scan and uploading scan data via the communication interface.

15. The printer according to claim 1, wherein the controller is configured to:

receive, via the user interface, registrations of a plurality of external functions, the plurality of external functions including regular external functions and non-regular external functions, each of the regular external functions being associated with the access information and the execution timing, each of the non-regular external functions being associated with the access information and not associated with the execution timing; and in response to receiving, via the user interface, a manual execution instruction to execute one of the non-regular external functions, execute the one of the non-regular external functions.

16. The printer according to claim 1, wherein the controller is configured to:

receive, via the user interface, a registration instruction including designation of the execution condition which is the execution timing;

determine whether the received registration instruction includes designation of the execution timing overlapping execution timings of already-registered external functions, the execution timings being indicated by the plurality of timing information stored in the memory; and in response to determining that overlap occurs, prompt a change of the execution timing.

17. The printer according to claim 1, wherein the controller is configured to:

in the download setup process, download a setting file including the setup data, items described in the setting file including an item in which a parameter is described and an item in which a binary file name is described;

in response to determining that the setting file includes the item in which the parameter is described, store the described parameter in the memory; and in response to determining that the setting file includes the item in which the binary file name is described, store a binary file specified by the binary file name in the memory.

18. The printer according to claim 17, wherein the controller is configured to:

control a scanner to scan an image to acquire image data; and attach the binary file to the image data and transmit, via the communication interface, the image data attached with the binary file to a storage.

* * * * *